Aug. 4, 1931.  E. J. KEARNEY ET AL  1,817,036
RATE CHANGE DEVICE
Filed March 21, 1927    5 Sheets-Sheet 1

Aug. 4, 1931.   E. J. KEARNEY ET AL   1,817,036
RATE CHANGE DEVICE
Filed March 21, 1927   5 Sheets-Sheet 5

INVENTORS
Edward J Kearney
Robert S Condon
BY
Fred G Parsons
ATTORNEY

Patented Aug. 4, 1931

1,817,036

UNITED STATES PATENT OFFICE

EDWARD J. KEARNEY, OF WAUWATOSA, AND ROBERT S. CONDON, OF MILWAUKEE, WISCONSIN, ASSIGNORS TO KEARNEY & TRECKER CORPORATION, OF WEST ALLIS, WISCONSIN

RATE CHANGE DEVICE

Application filed March 21, 1927. Serial No. 176,992.

This invention relates to rate change mechanism and with particular reference to a form of such mechanism suitable for machine tools.

A main object of the invention is to provide a rate change mechanism of improved form, improved controlling devices for such mechanism, and an improved combination thereof to a machine tool combination.

A purpose of the invention is to provide a device productive of a series of rate changes from the movement of a single lever, together with means indicating the particular rate corresponding with any given lever position.

In rate change devices, it is usually necessary for elements to stand in certain positions relative to other elements before they can be shifted to be connected for power transmission. In other positions such elements would be blocked from shifting movement by the striking together of the elements when it is attempted to shift into engagement. In such case, if the machine is in operation it is then necessary to wait until the elements move into correct relative positions, and if the machine is not in operation, it is necessary to manually move the one or the other element, before they can be shifted. An important purpose of this invention is to provide shifting means to overcome such difficulties so that the element shifting lever may be positioned where desired at any time in spite of resistance to the movement of an element connected to be shifted therefrom.

Another purpose is generally to simplify and improve the design, construction and operation of rate changers and their application to the requirements of machine tools.

The invention consists in the particular arrangement and combination of parts as herein illustrated described and claimed and is to be understood to include such modified constructions as may be equivalent to the structure claimed.

In the accompanying drawings the invention has been shown in connection with a machine tool of the type generally known as a knee and column type milling machine in which the improved rate change mechanism is used for the purpose of changing the feed rate of the work supports, although it will be apparent that its usefulness is not limited to this particular type of machine, nor to feed rate changers.

The same reference characters have been used throughout for designating the same parts in each of the several views of which.

Figure 1:
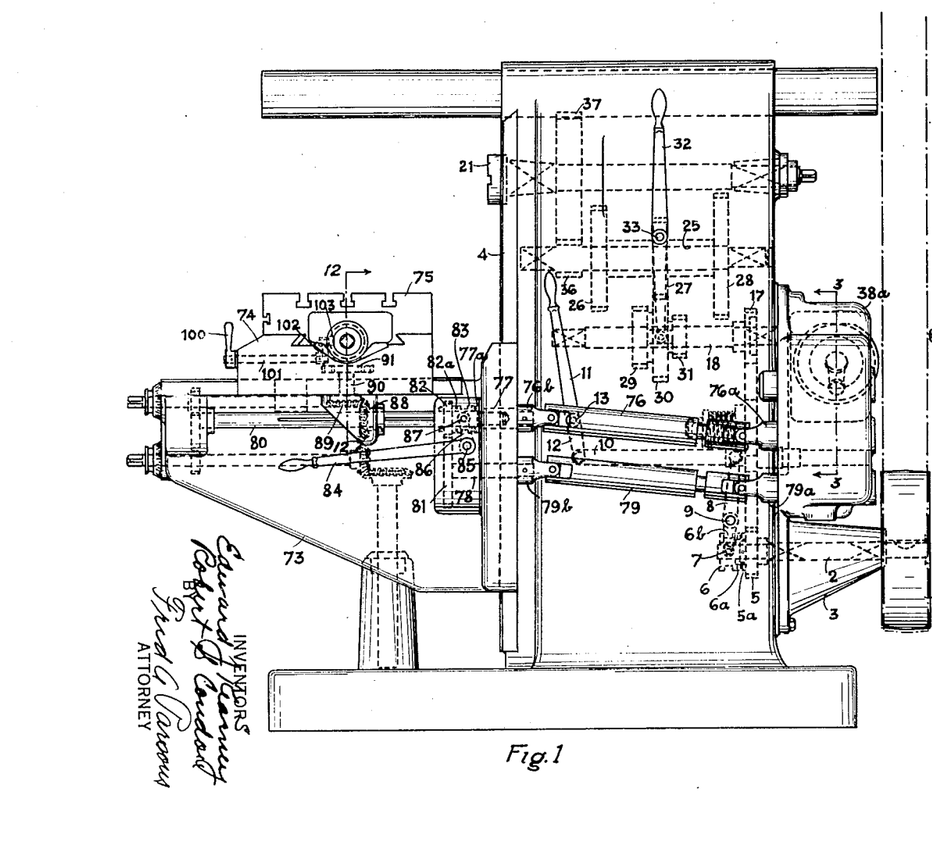
Fig. 1 is a right hand side elevation of the milling machine assembly. The operator's position is normally to the left of Fig. 1 and facing the machine.
Figure 2:
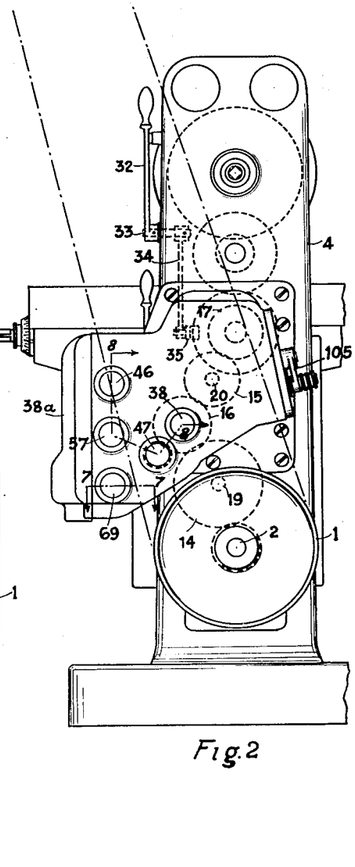
Fig. 2 is a rear elevation of the machine with one end of the table and of the saddle broken away.
Figures 3, 4, 6:
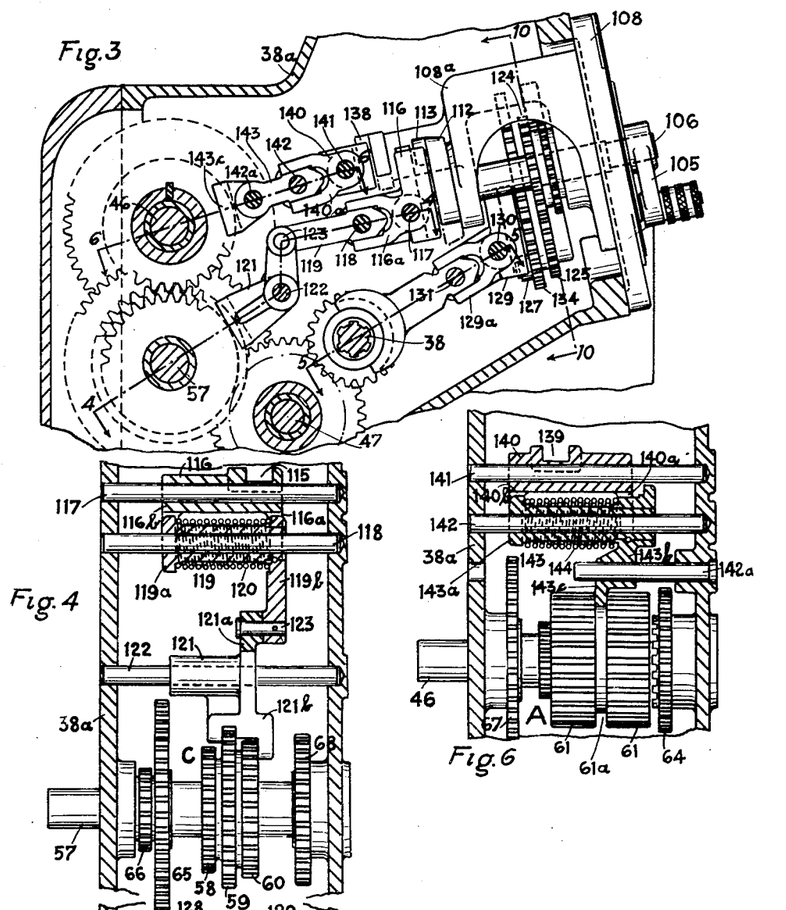
Fig. 3 is an enlarged partial transverse section through the rate change mechanism taken on line 3—3 of Fig. 1.
Fig. 4 is a developed section taken along line 4—4 of Fig. 3.
Fig. 6 is a section taken along line 6—6 of Fig. 3.
Figure 5:
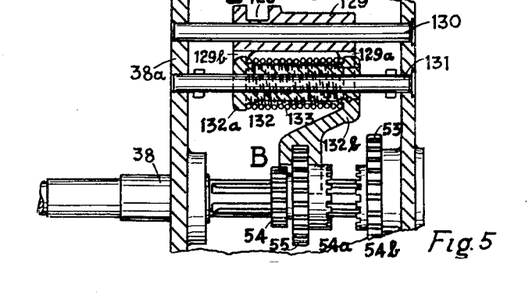
Fig. 5 is a section taken on line 5—5 of Fig. 3.

The milling machine shown in Figs. 1 and 2 is provided with driving pulley 1 mounted on a shaft 2 which is journaled in a bracket 3 bolted to a stationary support or column 4. A gear 5 is rotatable on shaft 2 and is provided with clutch teeth 5a. A clutch member 6 is slidably keyed to shaft 2 and has clutch teeth 6a complementary to the teeth 5a and an annular groove 6b engaged by a shoe 7 pivoted in lever 8. Lever 8 is supported by stud 9 in column 4 and connects through a link 10 with an inner lever 12 fixed on a shaft 13 to an outer end of which is fixed a hand lever 11. Thus clutch member 6 may be shifted in either direction for engagement or disengagement of the complementary clutch teeth 5a and 6a accordingly as lever 12 is rocked. When the clutch teeth are engaged, gear 5 transmits motion received from pulley 1 through intermediate gears 14, 15, and 16 to gear 17 which is fixed on shaft 18, supported for rotation in column 4. Intermediate gears 14 and 15 are rotatably supported by studs 19 and 20 fixed in the column, while intermediate gear 16 is fixed on the end of a shaft associated with the rate change gearing as will be described. Column 4 rotatably supports a tool spindle 21 which may be driven from shaft 18 at any of several speeds through a speed change mechanism as follows. A shaft 25 is rotatably journaled in the column and gears 26, 27, 28, of different diameters, are fixed thereon. Complementary gears 29, 30, 31, slidably keyed on shaft 18, are adapted for engagement one at a time with the gears 26, 27, 28, respectively. The gears 29, 30, 31, are fixed together and may be moved for engagement with the proper gears on shaft 25 by the means of a hand lever 32 fixed on a shaft 33 which projects inside the column and carries a lever 34 on its inner end. Lever 34 has a pivoted fork 35 engaging the sides of the gear 30. The spindle 21 is connected to be driven from shaft 25 by means of pinion 36 fixed upon or integral with shaft 25 and by a gear 37 fixed on the spindle, and thus may be driven at different speeds accordingly as the one or the other of gears 29, 30, 31 are engaged.

Figure 8:
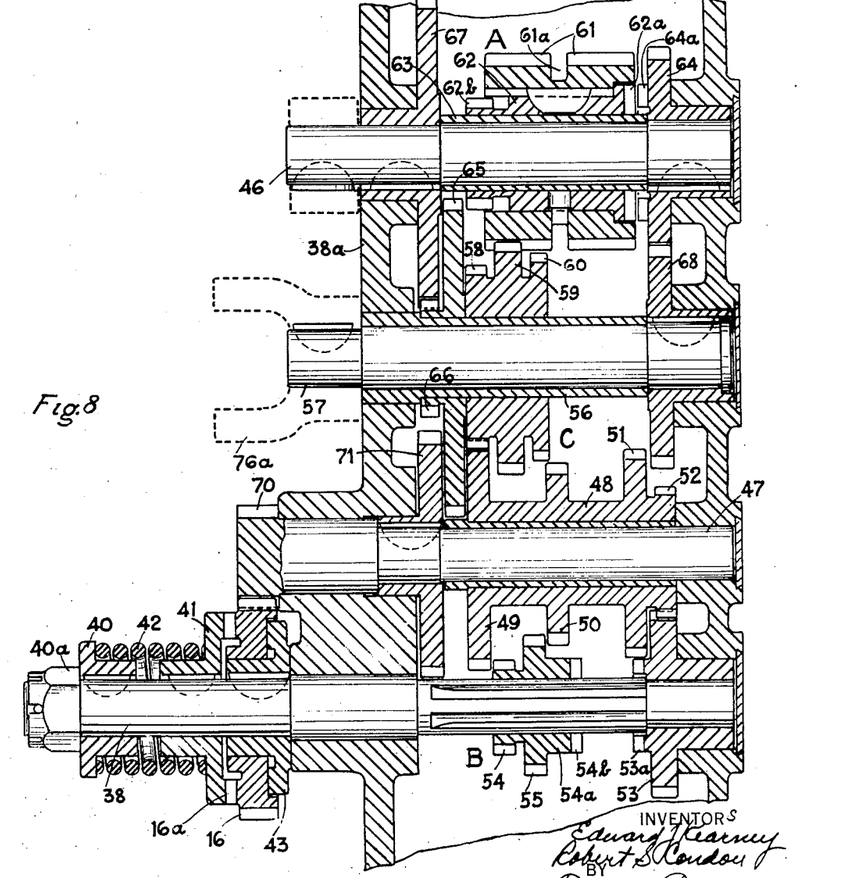

Fig. 8 shows rate change mechanism carried by a housing generally denoted as 38a in Figs. 1 and 2, the housing being fixed on column 4 in a position such that the intermediate gear 16 which is unitarily carried by the housing, is suitably meshed with the other intermediate gears 14 and 15. Gear 16 is supported from a shaft 38, but driving connection between gear 16 and shaft 38 is made by a safety or slip device providing means adapted to drive the shaft positively only up to a predetermined safe load as follows:

Gear 16 is rotatable on a thrust member 43 fixed on shaft 38, and is normally in driving engagement with a clutch member 41 through complementary intermeshed clutch teeth 16a. Clutch member 41 is slidably keyed on shaft 38 and the clutch teeth 16a are pressed into driving engagement under predetermined pressure by the means of a spring 42 abutting against a member 40 which is retained by a nut 40a threaded on shaft 38. The clutch teeth 16a have angular driving and driven faces formed after the usual manner for such devices (not shown) which under predetermined overload disengage against the resistance of spring 42, whereby shaft 38 stops, although gear 16 continues to revolve. The load which the device will transmit is determined by the angularity of the clutch faces and the pressure of the spring 42, and the parts are proportioned to yield before the driven mechanism is overloaded.

The shaft 38 is, by the mechanism described, normally driven from pulley 1 at a constant rate, and may drive a shaft 46 rotatably supported in housing 38a at a variety of feed rates by the means of the following mechanism.

A rotatable shaft 47 rotatably supports a sleeve 48 fixed against axial movement and upon which are fixed a series of different diameter gears 49, 50, 51, 52. Permanently meshed with gear 52 is a gear 53 axially coinciding with shaft 38 but rotatable relative thereto. Gears 54, 55, are fixed on a sleeve 54a slidably splined to shaft 38 and adapted for engagement, one at a time with gears 49 and 50 respectively. Sleeve 54a also is provided with clutch teeth 54b and gear 53 with complementary clutch teeth 53a. As the sleeve 54a is shifted the sleeve 48 may be driven alternatively through the sliding engagement of gear 54 with gear 49, or of gear 55 with gear 50, or by the engagement of clutch teeth 54b and 53a, when the meshed gears 52 and 53 will be operative, thus providing three changes of rate for sleeve 48 and the gears mounted thereon. Rotatably and slidably mounted on a sleeve 56 supported on a shaft 57 are the gears 58, 59, 60, respectively adapted for engagement one at a time with the gears 49, 50, 51. The gear 59 in all positions meshes with a wide face gear 61, fixed on a sleeve 62 which is both rotatable and slidable on a sleeve 63 rotatably supported on the shaft 46. At the one end the sleeve 62 is provided with clutch teeth 62a adapted for engagement with the clutch teeth 64a on a gear 64 fixed on shaft 46. When the sleeve 62 is moved to engage the clutch teeth, the shaft 46 is driven direct from the sleeve. On the other end sleeve 62 carries the pinion 62b, which may be moved to engage a gear 65 and shaft 46 is then driven through reduction gears consisting of pinion 62b, gear 65, a pinion 66 fixed with gear 65, and a gear 67 fixed on shaft 46. The shaft 57 is rotatable in the axial bore of sleeve 56 and is connected to be driven from shaft 46 by the means of a gear 68 fixed on shaft 57 and meshed with the gear 64. Thus both the shaft 46 and shaft 57 may be driven by the gearing described at any of eighteen changes of feed rate according to the position of the rate change elements.

Figure 7:
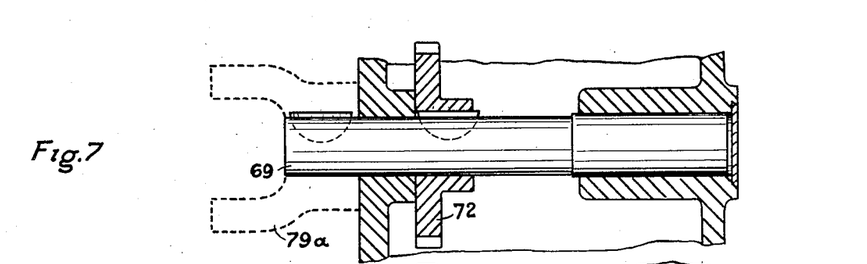
Figs. 7 and 8 are developed views of gearing taken along lines 7—7 and 8—8 respectively in Fig. 2 and enlarged.

A shaft 69 rotatably supported in the housing 38a is driven from gear 16 at a constant rate as follows. A pinion 70 meshes with gear 16 and is fixed on the shaft 47 upon which is also fixed the gear 71. Fixed on shaft 69 is a gear 72 which meshes with the gear 71 as may be seen by reference to the true relative position of the shafts shown in Fig. 2, although in Figs. 7 and 8 the shafts are shown separated for convenience in the developed views. The gear trains just described are, in the present instance, used for driving the work support of the milling machine. Slidably guided for vertical movement on column 4 is a knee or support 73 which slidably guides a saddle or support 74 for cross movement toward and from the column. Slidably guided on the saddle is a work table or support 75 movable relative to the saddle to right or left in Fig. 2. The several supports provide movement for work supported on table 75 in three transverse directions relative to spindle 21. In the ordinary machine of the type here shown, power movement may be applied to each of the three supports but driving arrangements for such purpose being well known, only an illustrative arrangement will be described, for driving table 75.

Figure 12:
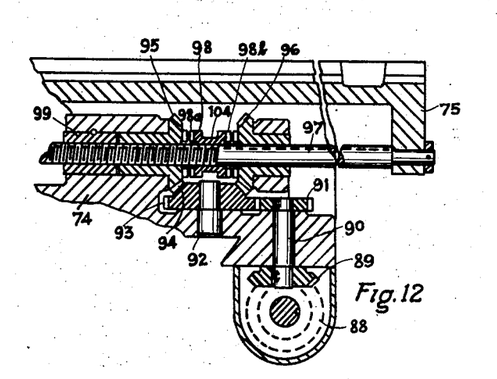
Fig. 12 is a partial section taken along line 12—12 of Fig. 1 and enlarged.

The feed shaft 57 is provided on the end toward the table with a member 76a fixed thereon, (see Figs. 1 and 8) and forming the driving member of an extensible universal joint shaft 76 of well known construction, there being a driven member 76b fixed on the end of a short shaft 77 journaled in knee 73. The constant speed shaft 69 similarly drives a short shaft 78 journaled in the knee through a driving member 79a and a driven member 79b which are parts of a similar extensible universal joint shaft 79. Thus the shafts 77 and 78 are respectively driven at a variable feed rate and at a constant rapid transverse rate, the universal joints forming a connecting train permitting movement of knee 73 relative to the power source. A shaft 80 is rotatably supported from the knee in axial alignment with shaft 77 but independently rotatable. A gear 81 fixed on shaft 78 drives a gear 82 supported on shaft 80 but independently rotatable. Gear 82 is provided with clutch teeth 82a, and the enlarged end of shaft 77 with clutch teeth 77a, and a clutch member 83, slidably keyed on shaft 80 is provided with complementary clutch teeth and may be alternatively shifted in the one or the other direction to be driven from shaft 77 or from shaft 78 by the means of a hand lever 84 fixed on a shaft 85 to which is fixed an inner lever 86 having a pivoted shoe 87 engaging with a suitable annular groove in a clutch member. A bevel gear 88 is supported from saddle 74 in axial alignment with shaft 80, which is axially parallel with the movement of the saddle, and the gear is slidably splined with the shaft whereby the gear will be driven from the shaft in any saddle position. Meshing with gear 88 is a gear 89 fixed on a shaft 90 at the upper end of which is fixed a gear 91. A stud 92, see Fig. 12, fixed in saddle, supports a gear 93 meshing with gear 91 and with which is fixed a bevel gear 94. Meshed with gear 94 are the oppositely driven bevel gears 95 and 96 rotatably free from but in axial alignment with a table screw 97 journaled in table 75 and fixed against axial movement relative to the table, but slidable through suitable bores in the gears. A clutch member 98 is slidably splined on table screw 97 between the gears 95 and 96, and is provided on its end faces with clutch teeth 98a and 98b. The gears 95 and 96 are provided with complementary clutch teeth adapted for engagement by the clutch member whereby according to the engagement with the one or the other gear, the screw 97 will be rotated in the one or the other direction. Fixed in saddle 74 is a nut 99 in threaded engagement with the screw 97 and accordingly as the screw is rotated the screw and table 75 will be advanced in the one or the other direction. Clutch member 98 may be shifted in either direction by the means of a hand lever 100, see Fig. 1 fixed on a shaft 101, upon an inner end of which is fixed a lever 102 having a portion 103 extended to engage with an annular groove 104 in the clutch member 98.

The rate changer previously described is provided with mechanism whereby the various rate change elements may be manually shifted as follows.

Figure 9:
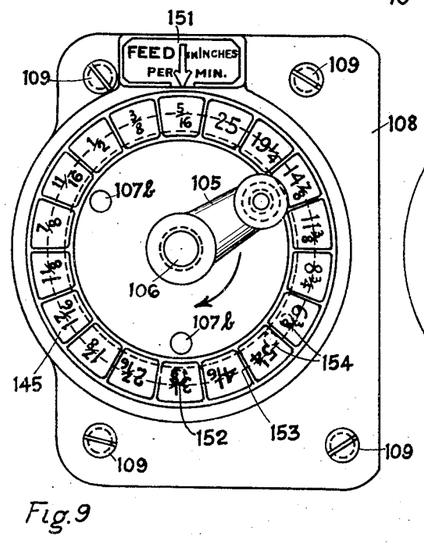
Fig. 9 is an enlarged view of the shifter lever and rate indicator as viewed from the right of Fig. 2.
Figure 11:
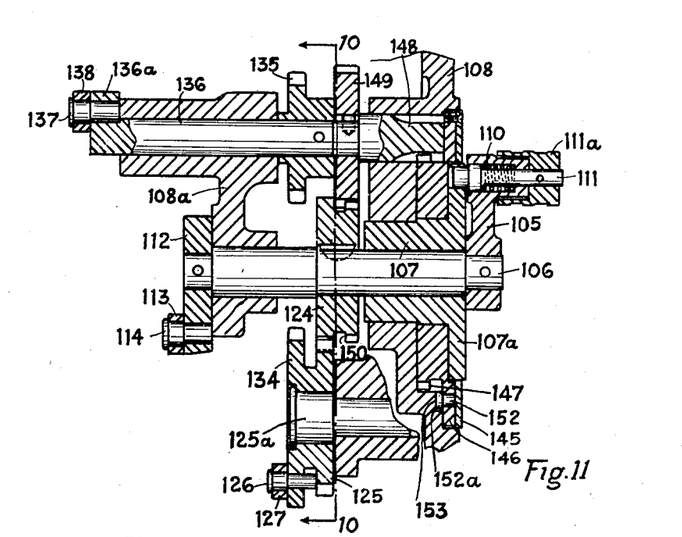
Fig. 11 is a developed section taken on line 11—11 of Fig. 10.

A hand lever 105 (see Figs. 2, 3, 9, 11, etc.) is fixed on a shaft 106, rotatably supported at the one end in a sleeve 107, (see Fig. 11) fixed in a removable plate or cover 108 which is fastened to the housing 38a by any suitable means, such as the screws 109 (see Fig. 9). At the other end the shaft 106 is rotatably supported in a suitable bore in a portion 108a integrally formed with the plate 108. The lever 105 is provided with a plunger 111 normally pressed by a spring 110 toward a flange 107a on the sleeve 107. When the lever is suitably positioned the plunger may enter any of several holes 107b equally spaced in flange 107a. The plunger may be withdrawn from the holes by the means of a hand grip 111a which also serves as a handle for the rotating shaft 106 to other positions. The rotation of shaft 106 shifts the various rate change elements through movements which include each position of the various elements and also each combination of positions of the various elements, in a manner which results in a progressive increase or decrease in the speed of the shafts 46 and 57 and of such mechanism as may be driven thereby according to the direction of movement of shaft 106. The rate change elements associated with shaft 57 may be shifted from shaft 106 by the following mechanism.

Referring to Figs. 3, 4, 6, 9, 10, 11, fixed on shaft 106 is a member 112 which carries a shoe 113 pivoted on a pin 114 fixed in the member, the construction providing a crank or eccentric for shifting the element from the shaft movement. Shoe 113 engages in a slot 115 in a shifter member 116 slidable on a rod 117 fixed in housing 38a. An adjacent rod 118, fixed in housing 38a, slidably carries a shifter member generally denoted by the numeral 119, comprising a sleeve 119a upon which is fixed an arm 119b, the sleeve and arm together being adapted to retain a spring 120 for movement therewith. Suitable portions of the member 119 are cut away to permit forked arms 116a and 116b on the member 116 to slide over the ends of member 119 and to respectively engage with the opposite ends of spring 120. A shifter member 121 is slidable on a rod 122 fixed in housing 38a and has an arm 121a connecting member 121 for movement with member 119 by the means of a pin 123. Another arm 121b forms a fork engaging with suitable faces of the gears 59 and 60 whereby gears 58, 59, 60 are movable with the shifter member 121. Spring 120 provides a resilient member in the motion transmitting train from shaft 106 to the rate change elements associated with the shaft 57, whereby any resistance to the shifting movement of the elements will permit the shaft to proceed and complete its movement, yet the elements will eventually be forced by the spring to the position corresponding to the final shaft position.

The shaft is likewise connected for the movement of the shiftable rate change elements associated with shaft 38. Fixed on shaft 106 is an intermittent or mutilated gear 124 (see Figs. 3, 10 and 11) adapted for action with a mating gear 125 rotatably supported from a housing portion integral with the plate 108 on a stud 125a. Gears 124 and 125 are so formed that during a certain portion of each revolution of shaft 106, the gear 125 will be moved through one third of a revolution while shaft 106 is completing one third of a revolution, and during the remaining two thirds revolution of shaft 106 the gear 125 will remain stationary, being then locked in position by the means of an untoothed portion 124a of the gear 124 which then engages with suitable tooth portions of the gear 125 in a manner as more particularly shown in Fig. 10, which prevents movement of gear 125 while permitting rotation of gear 124.

Figure 10:
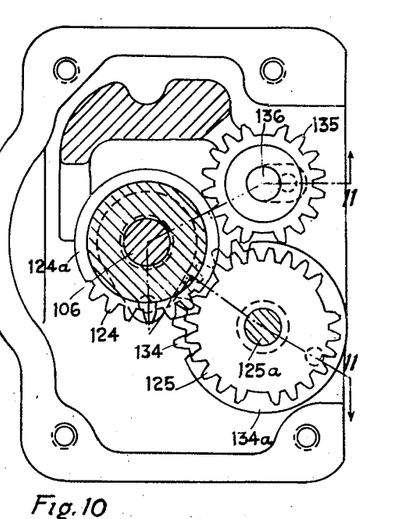
Fig. 10 is a partial vertical section taken on line 10—10 of Fig. 3.

The gears 125, 124, are so toothed and formed that three revolutions of shaft 106 will complete a revolution of the gear 125 although such motion is intermittent as described. Fixed to move with the gear 125 is a pin 126 upon which is pivoted a shoe 127, the pin and shoe providing a crank or eccentric for shifting the rate change elements from the rotation of gear 125. Shoe 127 engages with a slot 128 in a shifter member 129 slidable on a rod 130 fixed in housing 38a. An adjacent rod 131 fixed in the housing slidably carries a shifter member generally denoted by the numeral 132, comprising a sleeve 132a upon which is fixed an arm 132b provided with a fork engaging the opposite sides of gear 55, the sleeve and arm together being adapted to retain a spring 133 for movement therewith. Suitable portions of the member 132 are cut away to permit forked arms 129a and 129b on the member 129 to slide over the ends of member 132 and to respectively engage with the opposite ends of spring 133. Spring 133 provides a resilient member in the motion transmitting train from shaft 106 to the rate change elements associated with shaft 38, whereby any resistance to the shifting movement of the elements will permit the shaft to proceed and complete its movement, yet the elements will eventually be forced by the spring to the position corresponding to the final shaft position.

The shaft 106 is likewise connected for the movement of the rate change elements associated with shaft 46. Fixed with shifter gear 125 is an intermittent or mutilated shifter gear 134 (see Figs. 3, 10 and 11) adapted for action with a mating gear 135 fixed on the end of a shaft 136, which is journaled in a housing portion integral with the plate 108. Gears 134, 135 are so formed that during a one third portion of each revolution of gear 134, the gear 135 will be moved through one half of a revolution and during the remaining two thirds revolution of gear 134, the gear 135 will be locked in position by the means of an untoothed portion 134a of the gear 134 which then engages with suitably formed tooth portions of a gear 135 in a manner as more particularly shown in Fig. 10, which prevents movement of gear 135 while permitting rotation of gear 134.

Since gear 134 is intermittently moved through one third revolution for each revolution of shaft 106, it will be apparent that gear 135 and shaft 136 are intermittently moved through one revolution during six revolutions of shaft 106. Fixed on or integral with shaft 136 is an arm 136a which carries a pin 137 on which is pivoted a shoe 138, the construction providing a crank or eccentric for shifting the rate change elements from the revolution of shaft 136. Shoe 138 engages with a slot 139 in a shifter member 140, (see Fig. 6) slidable on a rod 141 fixed on housing 38a. An adjacent rod 142 fixed in the housing, slidably carries a shifter member generally denoted by the numeral 143, comprising a sleeve 143a upon which is fixed an arm 143b having a portion 143c fitted within an annular groove 61a in the gear 61. The member 143 is prevented from pivoting about rod 142 by the means of a rod 142a fixed in housing 38a and slidably fitting a suitable bore in arm 143b. Sleeve 143a and arm 143b together are adapted to retain a spring 144 for movement therewith. Suitable portions of member 143 are cut away to permit forked arms 140a and 140b of member 140 to slide over the ends of member 143 and to respectively engage with the opposite ends of spring 144. Spring 144 provides a resilient member in the motion transmitting train from shaft 106 to the shiftable rate change elements associated with shaft 46, whereby any resistance to the shifting movement of the rate change elements will permit the shaft to proceed and complete its movement, yet the elements will eventually be forced by the spring to the position corresponding to the final shaft position.

Figure 13:
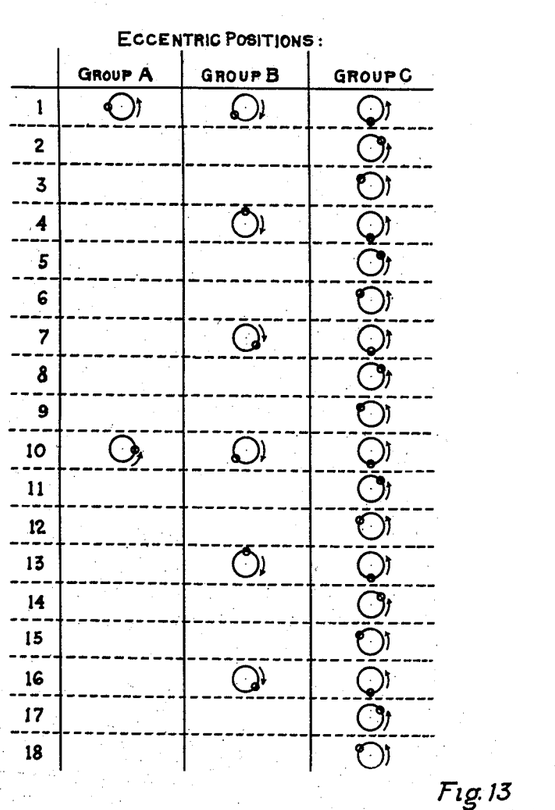
Fig. 13 is a chart or diagram indicating positions assumed by portions of the rate change mechanism.

The above describes the individual motion transmitting connections from shaft 106 to each of the several sets or groups of shiftable rate change elements. The gear 62b and clutch member 62a constitute a group of rate change elements designated as A, Fig. 8, which when shifted for the purpose of alternative power transmission produce relatively very large rate change effect; another group consisting of gears 54, 55, and clutch member 54b designated as B when so shifted produce relatively less rate change, while another group consisting of gears 58, 59, 60, designated as C is of least rate change effect when shifted. Between the various motion transmitting connections there exists an important relationship, arranged with reference to the rate changing effect of the several groups of rate change elements and to the changes effected by the alternative engagement of the individual elements of the group, as will now be explained. Fig. 13 is a diagram illustrating instantaneous relative position of the element shifting eccentrics or cranks in the respective shifting trains as shaft 106 is progressively turned, the diagram indicating successive crank positions as the shaft is revolved through six revolutions, at the instant when the plunger 111 passes over the holes spaced in flange 107a. Although in the various views the parts are for convenience shown in various relative positions, the relationship as it exists in the mechanism at the time when the shiftable rate change elements are located to produce the slowest speed of shaft 46 and 57, that is when the elements 54, 59 and 62b are engaged for driving as illustrated in line 1 of Fig. 13, assuming plunger 111 at such time engaged in any of the holes 107b, if the plunger is withdrawn and lever 105 moved in the direction of the arrow shown in Fig. 9 for the distance to the next plunger hole, the eccentric for group C will be moved to the position shown in line 2 of Fig. 13, thereby moving gear 59 out of engagement and engaging gear 60. Movement to the next plunger hole then moves the eccentric to the position shown in line 3 of Fig. 13, thereby disengaging gear 60 and engaging gear 58. The intermittent gears of the motion transmitting trains are so arranged that when the eccentrics are in the position indicated in line 1 of Fig. 13, shaft 106 must make two thirds of a revolution in the direction indicated before the shifting eccentric connected to group B is moved, but at the next movement of the shaft 106 the eccentric for group B will be moved from the position shown in line 1 to the position shown in line 4, thereby disengaging gear 54 and engaging gear 55. At the same time the eccentric for group C is moved to the position in line 4 whereby gear 58 is disengaged and gear 59 is again engaged. The successive positions taken up by the eccentric for group C during nine movements of lever 105 merely repeats the cycle of movement for this group but in each instance as the elements of group C move back to the starting position an element of group B is shifted by the action of the intermittent gears, and the gear ratios of the train are such that such progressive shifting results in a step by step increase in the speed of the driven shafts. The intermittent gears of the shifting train for group A are so arranged that when the eccentrics are in the position shown in line 1 of Fig. 13, nine movements or three revolutions of shaft 106 must take place before the shifting eccentric connected with group A is moved, but when moving from the position of line 9 to the position of line 10 that eccentric is also moved thereby disengaging gear 62b and engaging clutch member 62a. The other two eccentrics are then in the same position as in line 1 and during the next succeeding nine movements merely repeat a cycle represented by their movements, lines 1 to 9, but the drive through clutch 62a instead of gear 62b gives a relatively high series of speeds increasing during successive movements of shaft 106 in the same manner as for the relatively low series obtained during the first nine movements when driving through gear 62b. Thus the eighteen successive movements required for six revolutions of shaft 106 results in eighteen successive speed increases. It is obvious that a reverse movement of lever 105 may bring about the rate changes in reverse or decreasing order, and that, from any given lever position the lever may be moved to any other position to cause the rate change mechanism to arrive at any desired speed.

To indicate conveniently the speed of which a given lever position is productive, there is provided a dial or chart 145 (see Figs. 9 and 11) connected for movement from shaft 106. The dial is fixed on a member 146 fixed with or integral with a gear 147 rotatably supported on sleeve 107. A pinion 148 is rotatably journaled in plate 108 and meshes with gear 147. Fixed on the shank of pinion 148 is a gear 149 meshing with a gear 150 fixed on shaft 106. The ratio of the connecting gears is such that dial 145 makes a single revolution during six revolutions of shaft 106, that is during one complete cycle of rate change movements. The face of the dial is provided with numerals as indicated in Fig. 9, suitably indicating the effect of the mechanism for the different positions, and a stationary pointer 151 is fixed in a position to indicate which dial figure is to be regarded, the others being disregarded.

It is preferable that the device should be prevented from moving directly from the position productive of the highest speed to the position productive of the lowest speed, or vice versa, since this would create great strains in the driving trains and for other reasons. To prevent this a stop member or pin 152 is fixed in the member 146, see Figs. 9 and 11, having a projecting head portion 152a, for which clearance is provided in the plate 108 in the form of a circular groove 153. A stop or contact member or members 154 are fixed in the plate groove in a position to be contacted by the head portion 152a, in either direction of plate motion; in the one direction when the parts have arrived at the position represented by line 18 of Fig. 13, and in the other direction when the parts have arrived at the position indicated by line 1 of Fig. 13. Thus the gearing connecting dial 145 with shaft 106 also serves to actuate the stop in a suitable manner for the purpose.

From the above description it will be noted that lever 105 constitutes a common member of the shifting trains for the respective groups of rate change elements, from which the trains each derive motion, and that the respective trains are constituted according to the change effect of the group of elements to be shifted thereby. Thus the train for group C which is of least rate change effect provides merely a shifting eccentric to change the rotary motion of shaft 106 to the sliding motion of the rate change elements and connected with lever 105 by the means of shaft 106.

The train for group B which is of greater rate change effect includes a shifting eccentric for sliding the elements and in addition a pair of intermittent gears through which the shifting eccentric receives motion. The train for group A which is of still greater rate change effect includes a shifting eccentric arranged to receive motion from the common member through two pairs of intermittent gears, one pair of which is adapted to receive motion through the other, such other pair being a portion of the train for group B. Each of such trains includes a non-positive spring device.

The resilient shifter trains are of particular importance in a rate changer where one shiftable rate change element receives motion through another, and such elements are to be simultaneously shifted from disengaged to engaged positions. In such case the driven elements do not rotate during the time such shifting takes place and it will frequently occur that end face portions of such non-rotating elements block the engagement thereof and also block the engagement of the driving elements, which if engaged would rotate the driven elements to avoid the blocking position and permit engagement. However, by the means of the resilient shifter trains the driving elements are permitted to engage even if the driven elements are blocked, and it will therefore occur that the driven elements are moved out of the blocking positions and will be urged into engagement. The resilient connections also add greatly to the speed and convenience of shifting the lever 105, since lever movement is not seriously opposed by resistance to or blocking of the movement of any group yet any or all of the groups which may fail to follow in exact unison with the movement of the lever 105 will shortly thereafter be shifted to the position corresponding to the lever position.

Having now fully described the invention, we claim:

1. In a rate changer including a plurality of groups of rate change elements, the respective groups being shiftable through cycles of movement productive of different rate change effect, the combination of a shifting device therefor including a progressively movable shifter lever, means connected with said lever for shifting the one of said groups having the greater rate change effect to complete a cycle of its movement during a portion of a predetermined movement of said lever in a given direction and an eccentric device connected with said lever for shifting the other of said groups through a plurality of cycles of its movement during said portion of lever movement.

2. A rate changer including shiftable rate change elements, and element shifting means for determining a cycle of movement thereof including an eccentric device connected with said elements, a rotatable lever, and an intermittent gear device connecting said lever and said eccentric device; whereby said element is advanced through a portion of the cycle determined by said eccentric device at intervals determined by said intermittent gear device as said lever is rotated.

3. A rate change mechanism of the nature disclosed comprising transmission mechanism including a plurality of rate change elements each shiftable into power transmitting and non-power transmitting positions, and motion transmitting connections for shifting said elements; said connections including a movable member, an eccentric device connected both with said member and with one of said elements and adapted to shift the element with which it is connected alternately into its said positions as said member is progressively moved, and a connection from said member to the other of said element including an eccentric device adapted to move said other element from one to the other of its said positions and an intermittent gear device adapted to move the last named eccentric device only during portions of the movement of said member.

4. A rate change mechanism of the nature disclosed comprising transmission mechanism including first, second and third rate change elements each shiftable into power transmitting and non-power transmitting positions, a member movable for shifting said elements, a first motion transmitting connection from said member to said first element and including an eccentric device adapted to shift said first element alternately into its said positions as said member is progressively moved, a second motion transmitting connection from said member to said second element and including a second eccentric device adapted to move said second element alternately into its said positions and an intermittent gear device adapted to move said second eccentric device only during predetermined portions of member movement, and a third motion transmitting connection including a third eccentric device adapted to move said third element alternately into its said positions and an intermittent gear device connected for movement from the first named intermittent gear device whereby said third eccentric device is moved only during a portion of the movement of said member in part determined by the first named intermittent gear device.

5. In a mechanism including rate change elements shiftable to different positions collectively productive of a variety of rates; the combination of shifting means for movement of said elements through positions productive of all of said rates, a member geared with said shifting means to move in unison therewith, and stop means including a portion fixed with said member to limit the movement of said shifting means.

6. In a mechanism including rate change elements shiftable to different positions collectively productive of a variety of rates, the combination of shifting means for movement of said elements through positions productive of all of said rates, rate indicating means including a chart and an indicator movable relative thereto one of which is geared with said shifting means for movement to indicate on said chart the rates corresponding to the different shifter positions, and a stop including a plurality of contact members one of which is fixed with the movable portion of said indicating means.

7. In a device of the nature disclosed including rate change elements shiftable to different postions collectively productive of a variety of rates, the combination of element shifting means including a part rotatable through a plurality of revolutions and connected to move all of said elements through positions productive of all of said rates, a member geared with said part to move through not more than a single revolution while said part is completing its said movement, and a stop including a portion fixed with said member to prevent further revolution of said part.

8. In a rate change mechanism, the combination of a transmission including in the order recited a drive shaft, a first group of rate change elements relatively shiftable to engaged and disengaged positions, a second group of rate change elements also relatively shiftable to engaged and disengaged positions, and a driven shaft; and means for shifting elements of each of said groups including a hand lever, a motion transmitting train from said hand lever to an element of said first group and including a resilient device for lever movement in advance of element movement, a second motion transmitting train from said hand lever to an element of said second group and including a second resilient device for lever movement in advance of element movement, each of said resilient devices being adapted to urge the element connected therewith to a position corresponding to the position of said lever; whereby said lever may be moved in spite of resistance to the movement of elements in either of said groups and the elements of said first group may engage for relative rotation of the elements of said second group in advance of the engagement thereof and to prevent permanent abutment thereof in non-engaging positions.

9. In a rate changer having a plurality of groups of relatively rotatable and shiftable rate change elements arranged for a driven group to receive rotary motion through a driving group, the combination of shifting means for simultaneously shifting elements in each of said driving and driven groups including means adapted to permit the movement of said shifting means to precede the shifting of said elements of both said groups, whereby to insure relative rotation of the elements of said groups out of positions blocking engagement thereof.

In witness whereof we have hereto affixed our signatures.

EDWARD J. KEARNEY.
ROBERT S. CONDON.